(12) United States Patent
Ovchinnikov

(10) Patent No.: US 8,446,977 B2
(45) Date of Patent: May 21, 2013

(54) METHOD FOR TRANSMITTING DISCRETE ELECTRIC SIGNALS

(76) Inventor: Valery Vasilievich Ovchinnikov, Moscow (RU)

( * ) Notice: Subject to any disclaimer, the term of this patent is extended or adjusted under 35 U.S.C. 154(b) by 278 days.

(21) Appl. No.: 12/674,557

(22) PCT Filed: Sep. 12, 2007

(86) PCT No.: PCT/RU2007/000495
§ 371 (c)(1),
(2), (4) Date: Feb. 22, 2010

(87) PCT Pub. No.: WO2009/067037
PCT Pub. Date: May 28, 2009

(65) Prior Publication Data
US 2011/0110411 A1    May 12, 2011

(51) Int. Cl.
*H04B 15/00*   (2006.01)
*H04L 25/34*   (2006.01)

(52) U.S. Cl.
USPC ........... 375/288; 375/257; 375/287; 375/312; 375/346; 375/351

(58) Field of Classification Search
USPC ............... 375/237–239, 242–257, 295, 309, 375/312, 316, 346, 351, 286–288
See application file for complete search history.

(56) References Cited

U.S. PATENT DOCUMENTS

| | | | |
|---|---|---|---|
| 3,671,671 A * | 6/1972 | Watanabe | 375/257 |
| 3,868,519 A * | 2/1975 | Green | 327/108 |
| 3,949,168 A * | 4/1976 | Taub | 375/257 |
| 4,166,196 A * | 8/1979 | Rademaker | 178/79 |
| 4,429,384 A * | 1/1984 | Kaplinsky | 370/442 |
| 4,486,852 A * | 12/1984 | Champlin et al. | 713/400 |
| 4,627,076 A * | 12/1986 | Staal et al. | 375/257 |
| 4,719,458 A * | 1/1988 | Miesterfeld et al. | 710/240 |
| 4,808,855 A * | 2/1989 | Lloyd | 326/86 |
| 4,888,764 A * | 12/1989 | Haug | 375/219 |
| 4,994,690 A * | 2/1991 | Sundstrom et al. | 326/30 |
| 5,317,597 A | 5/1994 | Eisele | |
| 5,399,965 A * | 3/1995 | Heberle | 324/117 H |
| 5,589,813 A * | 12/1996 | Nielsen | 375/257 |

(Continued)

FOREIGN PATENT DOCUMENTS

| | | |
|---|---|---|
| RU | 2 050 039 | 12/1995 |
| RU | 2 247 469 | 2/2005 |
| RU | 2 259 633 | 8/2005 |
| SU | 1 255 003 | 6/1996 |

*Primary Examiner* — David C. Payne
*Assistant Examiner* — James M Perez
(74) *Attorney, Agent, or Firm* — Ladas & Parry LLP

(57) ABSTRACT

The invention relates to information transmission methods, in particular to the communication interfaces of electronic devices. The inventive method makes it possible to increase the communication range and reliability by improving noise protection through the compensation of a noise signal during the transmission and reading of the signal in both wires of a communication line. The inventive method involves connecting the first pole of a voltage supply source to the first wire of a two-wire transmission line via a first resistor and connecting the second pole of said voltage supply source to the second wire of the two-wire transmission line via a second resistor. Moreover, the first and second resistors have the equal resistance values, and a receiver is connected to the two-wire transmission line between a transmitter and the voltage supply source and is provided with two current sensors. A reading signal is defined as the sum of absolute values of the measured currents.

3 Claims, 4 Drawing Sheets

U.S. PATENT DOCUMENTS

| | | | | |
|---|---|---|---|---|
| 5,729,547 | A * | 3/1998 | Dute | 370/447 |
| 5,790,526 | A * | 8/1998 | Kniess et al. | 370/257 |
| 6,185,263 | B1 * | 2/2001 | Chan | 375/295 |
| 6,425,030 | B1 * | 7/2002 | Melcher | 710/110 |
| 6,553,076 | B1 * | 4/2003 | Huang | 375/257 |
| 6,563,419 | B1 * | 5/2003 | Herz et al. | 340/12.15 |
| 6,694,439 | B2 * | 2/2004 | Cho et al. | 713/300 |
| 6,839,210 | B2 * | 1/2005 | Roberts et al. | 361/64 |
| 7,015,798 | B2 * | 3/2006 | Hair et al. | 340/12.37 |
| 7,191,269 | B2 * | 3/2007 | Cluff | 710/106 |
| 7,331,010 | B2 * | 2/2008 | Dell et al. | 714/767 |
| 7,355,438 | B2 * | 4/2008 | El Sayed | 326/30 |
| 7,366,115 | B2 * | 4/2008 | Vandensande | 370/257 |
| 7,464,647 | B2 * | 12/2008 | Teowee et al. | 102/215 |
| 8,063,694 | B2 * | 11/2011 | Lindemann | 327/541 |
| 8,122,159 | B2 * | 2/2012 | Monreal | 710/9 |
| 2002/0065631 | A1 * | 5/2002 | Loechner | 702/188 |
| 2002/0150116 | A1 * | 10/2002 | Huang | 370/431 |
| 2005/0073403 | A1 * | 4/2005 | Cluff | 340/501 |
| 2005/0110515 | A1 * | 5/2005 | Ju et al. | 326/14 |
| 2005/0160208 | A1 * | 7/2005 | Hampel | 710/117 |
| 2005/0168343 | A1 * | 8/2005 | Longsdorf et al. | 340/664 |
| 2006/0019619 | A1 * | 1/2006 | Al-Shyoukh et al. | 455/127.1 |
| 2006/0026243 | A1 * | 2/2006 | Franchuk et al. | 709/206 |
| 2006/0159205 | A1 * | 7/2006 | Wagner et al. | 375/343 |
| 2011/0121794 | A1 * | 5/2011 | Mansfield et al. | 323/220 |
| 2012/0068618 | A1 * | 3/2012 | Koski et al. | 315/240 |

* cited by examiner

METHOD FOR TRANSMITTING DISCRETE ELECTRIC SIGNALS

FIELD OF THE ART

The present invention relates to methods for transmitting information, and specifically to communication interfaces of electronic devices, in particular, to methods of transmitting discrete electric signals.

BACKGROUND OF THE INVENTION

Known in the art is a method for transmitting discrete electrical signals in binary code from a transmitter to a receiver, interconnected by a three-wire communication line, with the communication line voltage supply source combined with the transmitter, including transmission over one wire relative to the common wire (ground) of a logic one and a logic zero from the transmitter by establishing a negative or positive voltage at its output and reading by the receiver of the value of the voltage relative to ground, and transmission of a signal using the same method over the other wire in the opposite direction with the aid of another transmitter-receiver pair. The method is known as the RS 232 interface.

A disadvantage of the known method is the low noise immunity and short communication distance, usually not more than 10 m. This is explained by the differing conditions for passage of a current in the wires of the line: the resistance in the circuit of the transmitting wires is higher than the resistance in the circuit of the common wire (ground), which contributes to emergence of a noise voltage under the influence of electromagnetic fields.

Furthermore, the method allows information to be transmitted only to one receiver, and requires that an independent bipolar electrical power supply be arranged for this, which leads to an increase in apparatus cost.

Also known is a method for transmitting discrete electrical signals in binary code from a transmitter to a receiver arranged on a three-wire communication line with the line voltage supply source combined with the transmitter, which includes the transmission of a logic one by simultaneously establishing a negative voltage in one wire and a positive voltage in the other wire relative to the third, transmission of a logic zero by establishing a close-to-zero voltage in the first and second wires relative to the logic zero of the third, and reading by the receiver of the voltage values in the first and second wires of the line. The method is known as the RS 485 interface.

The method has higher noise immunity and longer communication distance—up to 1000 m, allows a large number of devices to be interconnected and thus ensures signal transmission in both directions, but, as with the previous method, requires that an independent bipolar electrical power supply be provided for all devices connected to the line, which substantially increases the cost of the method. Furthermore, the separate power supply of the devices and longer communication distance lead to mismatch of their zero bus (ground) potentials, which may lead to the failure of instruments. To prevent this, galvanic decoupling of devices from the line is employed, which leads to additional increase in the cost of the information transmission method.

Closest in the technical essence and attainable result to the present method is a method for transmitting electrical signals via a MicroLAN bus (see, for a example Maxim "DS2409 MicroLAN Coupler", Feb. 7, 2003; "Automatic Identification Data-Book", Dallas Semiconductor®, 1995). The known method for transmission of discrete electrical signals from a transmitter to a receiver which are disposed on a two-wire communication line with a voltage supply source, the first pole of the source and the first wire of the communication line being grounded, while the second wire of the communication line is connected to the second pole of the source via a resistor, includes transmission of a logic signal in binary code by the transmitter closing the line with the aid of an electrical switch and the receiver reading the voltage value in the wire relative to ground. Here, a logic zero is usually considered to be a voltage level in the communication line below the first preset threshold, and a logic one—above the second preset threshold. As a rule, 0.8V and 1.2V values corresponding to logic TTL levels are chosen for such thresholds. In addition to the MicroLAN interface, many other known interfaces have been constructed in a similar manner.

The known method makes it possible to interconnect a large number of devices and to provide signal transmission in both directions over two wires, and permits the power supply of devices from the communication line, which reduces the cost of the method.

A disadvantage of the known method for transmitting discrete electrical signals is its low noise immunity. When affected by noise, though its effect is the same for both wires, the result of the effect is different, as different are conditions of propagation of noise in the grounded and non-grounded wires of the communication line, more specifically, different are resistances for flowing of the noise current in each wire from the point of effect to the pole of the power supply, or grounding. As a result, at the point of noise effect, as well as in other sections of the communication line, there emerges a voltage difference, i.e. the noise voltage, which prevents the desired signal from being transmitted appropriately.

SUMMARY OF THE INVENTION

The main object of the present invention is achieved of improving noise immunity in the course of both transmitting and receiving electrical signals in a communication line, while at the same time reducing the cost of the information transmission process.

The above object is achieved in a method for transmission of discrete electrical signals from a transmitter to a receiver connected to a two-wire communication line with a voltage supply source, where the reading signal is determined as a logic zero and one, according to the signal level in the communication line relative to preset thresholds, the receiver is connected to the two-wire communication line between the transmitter and the voltage supply source, and is provided with two current sensors, each installed in one of the wires of the two-wire communication line, the signal transmission being exercised by the transmitter changing the current in the two-wire communication line owing to its output resistance being changed and the two sensors measuring the value of the current, where the reading signal is determined as a sum of absolute values of the measured currents.

Preferably, the first pole of the voltage supply source is connected to the first wire of the communication line via the first resistor, while the second pole of the voltage supply source is connected to the second wire of the communication line via the second resistor, where the first and the second resistors have the same resistance values.

Figure 1:
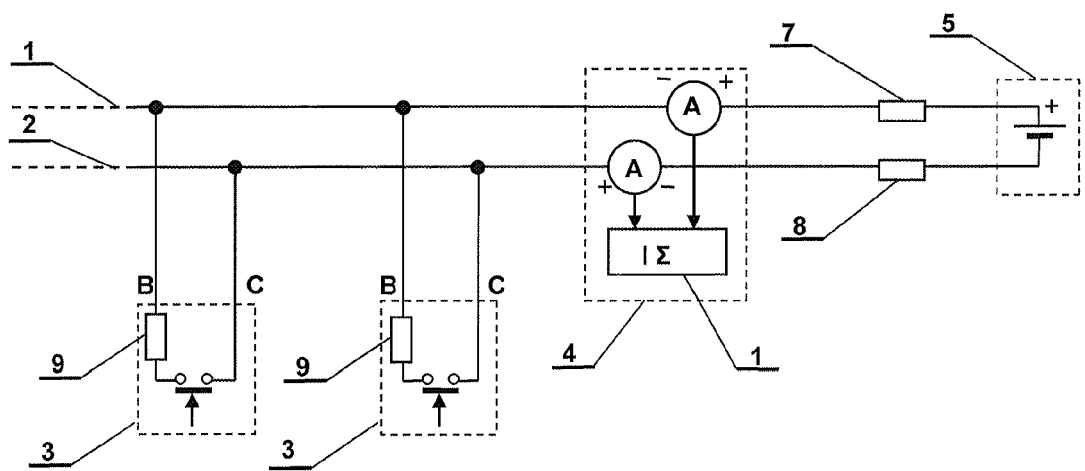
FIG. 1 schematically shows a structure of the appliance designed to transmit signals according to an embodiment of the claimed invention.
Figure 2:
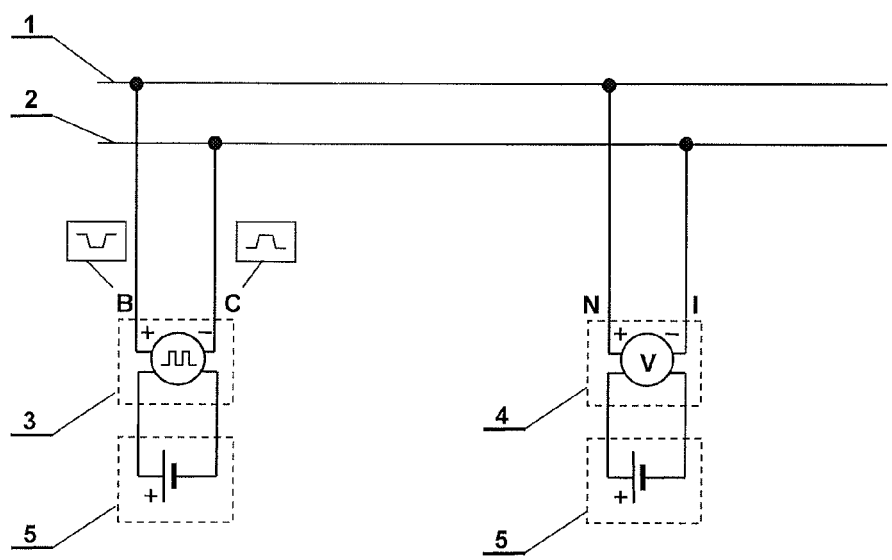
Figure 3:
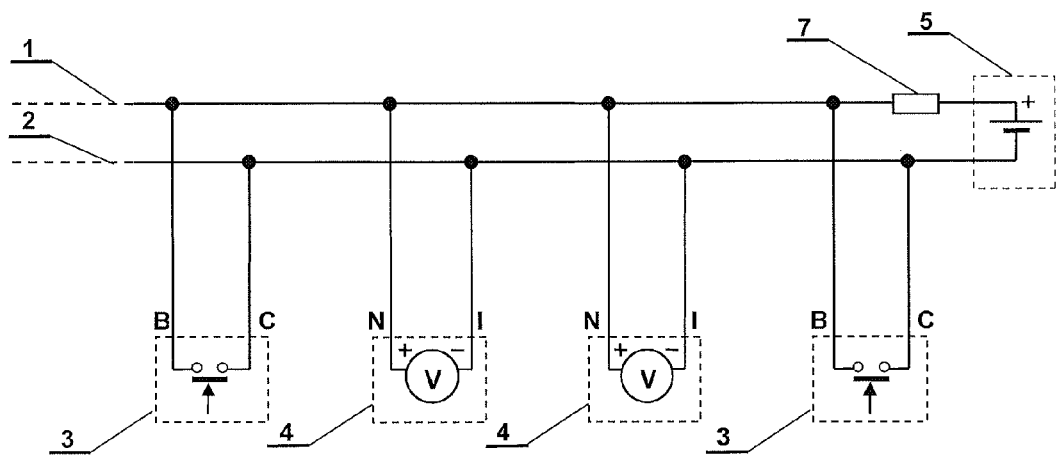
Figure 4:
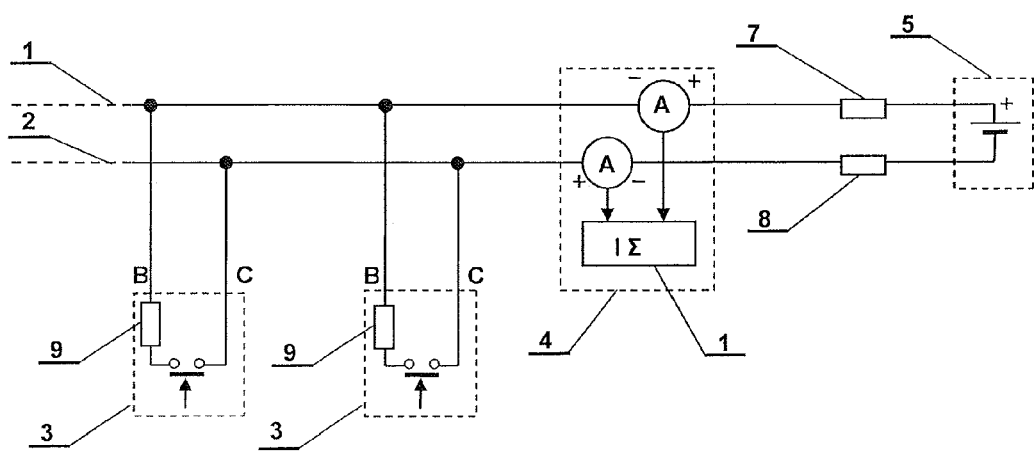

The substance of the invention consists of the following.

In this method transmitting electric signals, for reading signals from remote transmitters, when the line resistance and capacity reach high values, as well as for additional reduction of noise sensitivity, signal transmission based on the current loop principle is applied. However, application of the known current loop principle as such will only worsen the noise sensitivity, as currents in the two wires of the communication line flow in the opposite directions, while currents induced owing to a common-mode noise are of the same direction. Addition of the desired signal current and the noise current will result in the value of current becoming higher in one of the wires of the communication line and lower in the other one; therefore, measuring the current in just one communication line by means of a single current sensor only will ensure the maximum effect of the noise on the desired signal. Therefore, to compensate the effect of noise on reading of the signal by the receiver, two current sensors are introduced in this invention, one for each of the wires. Deduction of the current values measured by the sensors, with their sign taken into account (or, in other words, addition of their absolute values) will result in a situation, when the part of the currents related to the noise will be mutually cancelled, while the part of the currents related to the desired signal will double. Addition of the absolute values of the two currents would give the same result. Therefore, to measure the desired signal and to separate it from the noise signal, it is necessary to deduct the difference in the readings of two current sensors, with their sign taken into account, or to calculate the sum of the absolute values of the readings of the two current sensors.

To ensure identical conditions for propagation of signals in both wires of the two-wire communication line, it is preferable to ensure, for each wire of the communication line, equal resistances between the noise effect point and the corresponding pole of the voltage supply source, which is achieved by installation of resistors of the same value between each wire of the communication line and a pole of the voltage supply source, to which it is connected. This results in compensation of voltage of the common-mode noise signal all along the communication line, with the voltage in the communication line in the transmitter location area containing no noise signal and not distorting the signal from the transmitter. Here, the noise signal level is reduced a thousand times, which makes it possible to exercise communication even in conditions, where, with the prototype method used, the noise voltage would be much higher than the desired signal.

The substance of the method for transmitting discrete electric signals from a transmitter to a receiver over a two-wire communication line, which ensures compensation of the noise signal in the course of both transmission and reception of signals transmitted over long distances, is illustrated including but not limited to examples of its implementation.

EXAMPLE

Wires of a two-wire communication line implemented in the form of a so-called twisted pair are connected to the poles of the voltage supply source via the same 1 kΩ limiting resistors. A receiver and a transmitter are connected to the wires of the communication line, where the receiver is connected between the transmitter and the power supply.

The transmitter is a microprocessor with an output cascade in the form of a microprocessor-controlled switch connected in parallel to the communication line and having a limiting resistor for ensuring a preset current value in the communication line in the course of transmission. It is possible to limit the transmission current by means of a controllable current stabilizer.

The receiver is equipped with a microprocessor and two current sensors, installed one in each wire of the communication line and connected one as a source current sensor, and the other as a sink current sensor. Outputs of the current sensors are connected to inputs of an adder used for addition of the absolute values of signals from the sensors (deduction of the signals values, with their sign taken into account), where the adder output is connected to the microprocessor reading input.

The normal state of the communication line corresponds to transmission of a logic one; here, the voltage in the communication line is close to the voltage of supply source, which allows power-supplying the transmitter and other devices connected to the communication line. Here, the current in the communication line (current consumed by connected devices) does not exceed a preset threshold. The logic zero is formed for a short time, by creating an additional current in the communication line due to closing the communication line with a transmitter via a limiting resistor.

The wires of the line are placed in an electromagnetic field, creating noise, or a common-mode noise voltage is supplied from a generator to both wires of the communication line. The noise voltage between the wires of the line is measured close to the receiver and to the transmitter. As a result of the compensation, the noise voltage between the wires of the communication line proves to be a thousand times less than the common-mode noise voltage supplied from the generator. To simulate the conditions of noise propagation in the prototype (for the purpose of comparison), one of the resistors is closed, whereby the signal at the output of the adder is distorted considerably. Similarly, to illustrate noise compensation owing to installation of two current sensors, one of the sensors is closed, whereby the signal at the adder output is also distorted.

FIG. 1 illustrates an example embodiment of the present invention. In the method for signal transmission, the communication line wires 1, 2 are connected to B, C outputs of transmitter(s) 3 and inputs of receiver 4 (connection in series). The only power source 5 in the FIG. 1 is connected directly to communication line wires 1, 2 through limiting resistors 7 and 8 of equal values. Transmitters 3 and receiver 4 are provided with power from communication line wires 1, 2. Transmitters 3 are realized as a circuit with current limitation, so (as an option) they also contain resistors 9 limiting the current signal value in the communication line. Receiver 4 contains also a logic unit designed to add up absolute current values measured with two ammeters (current sensors). The logic unit does not have to be isolated structurally (here it is done for better comprehension); it can be realized in a common circuit with two current sensors. Of course, the present invention is not limited by the details shown in the example embodiment shown in the FIG. 1.

The advantages of the invention are provided due to the fact that compensation of noise voltage and noise current in a line is achieved as a result of ensuring identical conditions for both propagation and reading of signal in both wires of a line. This allows communication distance and reliability to be increased by enhancing noise immunity, with the cost of the information transmission process reduced at the same time.

The invention claimed is:

1. A method for transmitting discrete signals from a transmitter to a receiver connected to a two-wire communication line with a voltage supply source, wherein a reading signal is determined as a logic zero and one by the level of signal in the two-wire communication line, relative to preset thresholds, said method comprising the following steps:
- implementing the two-wire communication line by a current loop principle, wherein the voltage supply source is connected to one end of the two-wire communication line and the signal is transmitted by the transmitter changing the current in the two-wire communication line due to its output resistance being changed;
- connecting the transmitter and the voltage supply source to the two-wire communication line;
- connecting the receiver to the two-wire communication line between the transmitter and the voltage supply source;
- providing the receiver with two current sensors, one for each wire of the two-wire communication line;
- measuring current value by said two current sensors; and
- determining the reading signal as a sum of absolute values of the measured currents.

2. The method of claim 1, further comprising the steps of:
- connecting a first pole of the voltage supply source to the first wire of the two-wire communication line via a first resistor; and
- connecting a second pole of the voltage supply source to the second wire of the two-wire communication line via a second resistor,
- wherein said first and second resistors have the same resistance values.

3. A method for transmitting discrete signals from a transmitter to a receiver connected to a two-wire communication line with a voltage supply source, wherein a reading signal is determined as a logic zero and one by the level of signal in the two-wire communication line, relative to preset thresholds, said method comprising the steps of:
- connecting the receiver to the two-wire communication line between the transmitter and the voltage supply source;
- providing the receiver with two current sensors, one for each wire of the two-wire communication line; and
- exercising the signal transmission by the transmitter changing the current in the two-wire communication line owing to its output resistance being changed and the two sensors measuring the value of the current, and determining the reading signal as a sum of absolute values of the measured currents, said method further comprising:
- connecting the first pole of the voltage supply source to the first wire of the two-wire communication line via the first resistor, and
- connecting the second pole of the voltage supply source to the second wire of the two-wire communication line via the second resistor,
- wherein said first and the second resistors have the same resistance values.

* * * * *